United States Patent [19]
Nelson

[11] 3,827,849
[45] Aug. 6, 1974

[54] COMBUSTION CONTROL APPARATUS
[75] Inventor: Lorne W. Nelson, Bloomington, Minn.
[73] Assignee: Honeywell Inc., Minneapolis, Minn.
[22] Filed: Dec. 20, 1971
[21] Appl. No.: 209,612

[52] U.S. Cl. .................................. 431/90, 137/100
[51] Int. Cl. .............................................. F23h 1/02
[58] Field of Search .............................. 431/90, 12; 251/335 A; 137/99, 100, 483, 500

[56] References Cited
UNITED STATES PATENTS
2,670,940  3/1954  Hunt ................................. 137/99 X
2,962,094  11/1960  Wallace ............................ 431/90 X
3,493,005  2/1970  Kakegawa .......................... 137/100

*Primary Examiner* — Edward G. Favors
*Attorney, Agent, or Firm* — Lamont B. Koontz; Alan M. Staubly

[57] ABSTRACT

Combustion control apparatus wherein a thermostat controls the operation of a combustion air blower and a modulating type of gas valve, a heat load sensor modulates the gas flow, and means responsive to the rate of gas flow and air flow adjusts the air flow to maintain a constant fuel/air ratio for the combustion mixture.

10 Claims, 1 Drawing Figure

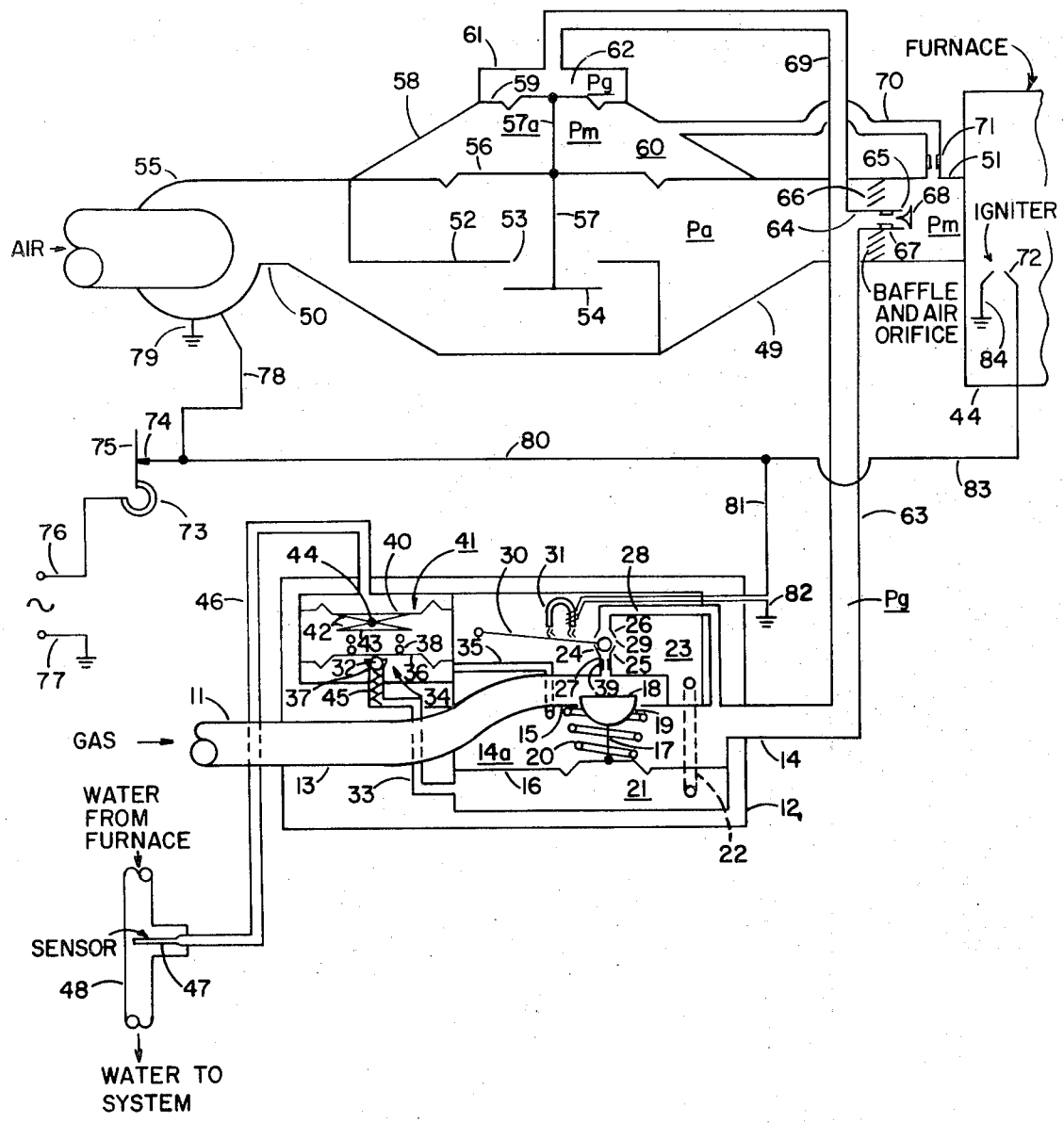
INVENTOR.
LORNE W. NELSON
BY Alan M. Staubly
ATTORNEY.

COMBUSTION CONTROL APPARATUS

This invention relates to combustion control apparatus for use with fuel burning furnaces which require the furnishing of primary air by means other than the inspirating effect produced by the fuel burner. Furnaces of this type are those placed on roof tops or otherwise externally of the building being heated as well as small units used within buildings.

While there are numerous prior art control systems for supplying and controlling air as well as fuel supplied to furnaces of this general type, they have been somewhat complicated in arrangement and structure which tends to make their use rather expensive. For example, such systems are shown in U.S. Pats. Nos. 2,052,375 and 1,824,130. The apparatus disclosed herein is deemed to be an improvement over the prior art arrangements in that more simplified apparatus is used to provide the desired end result, a constant fuel/air ratio. Basically, this invention is directed to such an arrangement of control apparatus which controls the flow of fuel (gas) to a furnace in response to means for initiating this operation as well as in response to means for regulating fuel flow according to heat demand. A modification of the valve disclosed in U.S. Pat. No. 3,354,901 is used for this purpose. A fuel/air/ratio is maintained substantially constant by means which controls the amount of the air flow according to the rates of gas flow and air flow.

The single FIGURE of the drawing is a schematic showing of the control apparatus.

This means for controlling gas flow from a source, designated by the reference numeral 11 is a modulating type of valve 12. It has an inlet 13, an outlet 14 and a partition wall 15 therebetween. A diaphragm 16 in the valve is connected by a valve stem 17 to a main valve 18. This valve cooperates with an aperture through the wall 15 forming a valve seat 19 to regulate gas flow through the valve. A coil spring 20 normally biases the diaphragm and valve 18 to their closed positions. A pressure chamber 21 below the diaphragm 16 is connected by a passageway 22 to a chamber 23 in the upper portion of the valve body.

Located in the chamber 23 is a three-way valve 24 which moves between valve seats 25 and 26 to control the flow of fuel into and out of the pressure chamber 21. Valve seat 25 is connected through a passageway 27 to the inlet passageway 13 and valve seat 26 communicates through a passageway 28 with outlet 14. A transverse opening 29 between the two valve seats communicates with chamber 23. A pivoted valve actuator 30 cooperates with an electro magnet 31 to move the valve from seat 25 to seat 26 upon energization of the electro magnet.

A second control valve 32, of the pressure regulator type, is located in a passageway 33 leading from the pressure chamber 21 to a chamber 34 which, in turn, communicates through a passageway 35 with the outlet chamber 14a. A diaphragm 36 is responsive to gas pressure in the outlet chamber 14a to move away from a valve seat 37, at the end of passageway 33, to control the bleeding of the fuel in chamber 21 to the outlet 14 against the bias of spring 38. This arrangement provides pressure regulation of the fuel through the valve body 12 by controlling the position of valve 18. An orifice 39 in the passageway 27 limits the rate of fuel flow into the chamber 21 while the valve 32 regulates the flow out of the chamber 21.

The loading on the spring 38, which determines the outlet pressure of the gas in the valve body, is accomplished by a diaphragm 40, forming one wall of chamber 41, acting on a motion reversing lever arrangement 42 positioned between the diaphragm and a plate 43 on one end of the spring 38. The lever arrangement is pivoted on a fixed pivot 44 so that as the diaphragm 40 moves upwardly and away from the pivot 44, the lever arrangement forces the plate 43 and the upper end of the spring 38 downwardly to additionally load the spring action on valve 32. The valve 32 is caused to follow the movement of the diaphragm 36 by means of a light spring 45.

The chamber 41 is connected by a capillary tube 46 to a bulb type of sensor 47 located in a water conduit 48 leading from the furnace to the heating system. It is readily understood that as the temperature of the water in the conduit 48 decreases, the fluid in the bulb and chamber 41 will decrease the volume causing the diaphragm 40 to move away from the fixed pivot 44 and thus increase the loading on spring 38. Therefore, the throttling of the valve 32 causes an increase in the pressure of chamber 21 and further causes the lifting of the valve 18 which increases gas flow to the furnace. Upon an increase in the water temperature the reverse action takes place.

The apparatus for controlling the flow of air to mix with the gas comprises a valve housing 49 having an inlet 50 and an outlet 51. A partition wall 52 between the inlet and outlet has an aperature 53 formed to provide a valve seat for a cooperating valve 54. An air blower 55 is connected to the inlet 50 to supply air to the valve when the blower is energized.

The air flow from the blower controlled by a large diaphragm 56 which forms a wall portion of the valve housing 49 and is connected to the valve 54 by a valve stem 57. The diaphragm 56 is enclosed by a sleeve-like housing 58 which is closed at its upper end by a smaller diaphragm 59. The smaller diaphragm is connected by a stem 57a to the diaphragm 56 substantially in line with the stem 57. The smaller diaphragm is also enclosed by a cup-shaped housing 61 which forms a pressure chamber 62 above the diaphragm 59.

Gas is supplied to the outlet chamber 51a by means of a conduit 63 and branch conduit 64. The branch conduit 64 is substantially coaxial with the outlet 51 and terminates at an outlet 65. The branch conduit 64 preferably extends through a baffle unit 66 in the outlet passageway 51, has an orifice member 67 therein to restrict gas flow, and has a spreader 68 which deflects and spreads gas flowing from the outlet 65 into alignment with turbulent air issuing from the baffle unit 66. The baffle unit also serves as an air orifice or restrictor for air flow. A branch conduit 69 is connected to conduit 63 and communicates with the chamber 62 so that the chamber 62 has the same gas pressure therein as is present in conduit 63. A conduit or passageway 70 extends from the outlet 51, from position downstream of the baffle 66 and outlet 65, to chamber 60. Chamber 60, in a stable gas flow condition, will sense the outlet pressure of the mixture of gas and air which is discharged into the burner (not shown) in furnace 44. A leak limiting orifice 71 in the conduit 70 prevents rapid fluctuations in the gas pressure in chamber 60.

The gas and air mixture blown into the gas burner is ignited by means of a suitable igniter 72, illustrated as a spark igniter, when there is call for heat from the system. Obviously the igniter may take other forms; for example, well known control means may be provided to interrupt the energization of the igniter once flame has been proven.

The means for initiating the operation of the above described apparatus is illustrated in a simplified arrangement which may, obviously, be made more sophisticated by the inclusion of high limit and low limit controls and by additional thermostatic means if the water from the furnace is supplied to various heating zones. Since these various additional controls are well known in the art, however, only a simplified circuit is shown for operating the invention disclosed above. A room thermostat, generally designated by the reference numeral 73, has a fixed contact 74 and a movable contact 75, the latter being connected to a live wire 76 of an electrical power source. Another wire 77 of the power source is grounded. The fixed contact 74 is connected by lead wire 78 to the blower 55 which is grounded by wire 79. The fixed contact is also connected by wire 80 and wire 81 to the relay 31 which, in turn, is grounded by wire 82. Fixed contact 74 is also connected to the igniter 72 by wire 80 and wire 83, the igniter being grounded by wire 84.

It is thus seen that when the thermostat 73 calls for heat, by the closing of contacts 74 and 75, the apparatus will place the air blower into operation, energize the relay 31 to move valve 24 from seat 25 to seat 26, thus supplying inlet gas through passageway 27 and chamber 23 and passageway 22 to pressure chamber 21, to open gas valve 18, and energize the igniter. When gas valve 18 opens, gas will be supplied to the air valve 49, which is already being supplied with air to deliver a mixture of gas and air to the burner, where it will be ignited by igniter 72. The air pressure will be regulated by the diaphragm 56 in response to the air pressure downstream of valve 54 and the gas pressure will be regulated by the diaphragm 16 in response to gas pressure in the outlet chamber 14a. The pressure on the lower side of diaphragm 16 is controlled by the amount of bleeding of gas past the regulator valve 32, as mentioned above. The position of valve 32 is determined by the position of diaphragm 36 which, in turn, responds to the gas pressure in chamber 14a and the loading of spring 38, as also explained above.

Once the system has been placed in operation, the temperature of the water in conduit 48 will control the pressure in chamber 41 by expanding or contracting the fluid in sensor 47, so as to vary the loading on valve 32 in response to heat demands. As the position of the gas valve 18 changes, the pressure in conduit 63 will change and cause a corresponding change in the pressure in chamber 62 as well as a change in chamber 60 and a pressure differential change between the opposite sides of the orifice 67 to cause a repositioning of the valve 54. It is thus seen that as the gas flow increases or as the pressure increases in conduit 63, the diaphragm 59 will tend to move the valve 54 to a wider open position to increase the air flow to maintain the fuel/air ratio. A change in the pressure of the fuel-air mixture will be sensed in chamber 60. This pressure acts on diaphragm 56 to compare pressures on opposite sides of baffle 66 for the purpose of exerting a control on the valve 54. This assists in the regulation of the valve 54 and thus provides a finer adjustment of the ratio.

How the apparatus functions to provide a substantially constant fuel/air ratio may be explained by the following formulas, wherein;

$Pa$ is the pressure upstream of air orifice;
$Pg$ is the fuel pressure upstream of fuel orifice;
$Pa$ is the mixture pressure downstream of air and fuel orifice;
$Aa$ is the area of air orifice;
$Ag$ is the area of fuel orifice;
$Wg$ is the mass flow rate of fuel;
$Wa$ is the mass flow rate of air;
$Ada$ is the area of the diaphragm exposed to air;
$Adg$ is the area of the diaphragm exposed to fuel;
$K_1$ is the air density constant;
$K_2$ is the fuel density constant;
$K_3$ is the fuel/air ratio constant desired; and
$K_4$ is the constant ratio between Ada and Adg.

Thus,
$Wg = K_2 \, Ag \, \sqrt{Pg - Pm}$
$Wa = K_1 \, Aa \, \sqrt{Pa - Pm}$, and
$Wg/Wa = K \, \sqrt{Ps - Pm/Pa - Pm}$.

But
$(Pg - Pm) \, Adg = (Pa - Pm) \, Ada$,
$Pg - Pm = (Pa - Pm) \, Ada/Adg = K_4 \, (Pa - Pm)$, and
$Wg/Wa = K \, \sqrt{K_4 \, (Pa - Pm)/Pa - Pm} = K \, \sqrt{K_4} = K_3$ (constant)

From the above disclosure of how the apparatus operates, it is believed apparent that the apparatus is a much simpler arrangement than that disclosed in prior art arrangements and provides a constant fuel/air ratio for efficient burner operation. Obviously modifications may be made in the apparatus that will still fall within the scope of the inventive concept. Therefore, the scope of the invention should be determined from the appended claims.

The embodiments of the invention in which an exclusive property or right is claimed are defined as follows:

1. Combustion control apparatus comprising a valve body having an inlet for connection with a source of air, an outlet for connection with a furnace and a partition wall therebetween with an aperture therethrough forming a valve seat;

air flow orifice means between said seat and outlet;
a first diaphragm forming a wall portion of said valve on the outlet side of said partition wall;
a valve operably connected to said first diaphragm and cooperable with said valve seat to control air flow therethrough;
a first housing outwardly of and enclosing said first diaphragm and forming a first pressure chamber therebetween, said first housing having an opening in a wall thereof;
a second diaphragm closing said opening and being operably connected to said first diaphragm;
a second housing enclosing said second diaphragm and forming a second pressure chamber therebetween;
conduit means for fuel extending into said valve body and having an outlet near said air flow orifice means and a branch conduit having a fluid flow connection with said second pressure chamber.

2. Combustion control apparatus as defined in claim 1 wherein orifice means restricting fuel flow is located in said conduit means between said branch conduit and said conduit means outlet.

3. Combustion control apparatus as defined in claim 1 wherein a passageway extends from said first pressure chamber to said outlet downstream of said air flow orifice means and said first conduit outlet.

4. Combustion control apparatus as defined in claim 3 wherein orifice means is located in said conduit means between said branch conduit and said conduit means outlet.

5. Combustion control apparatus as defined in claim 1 in combination with a modulating type valve for controlling fuel flow to said air control valve through said conduit means.

6. The combination defined in claim 5 wherein said fuel controlling valve has means for adjusting the rate of fuel flow therethrough in accordance with heat demand.

7. The combination of claim 6 in which the means for adjusting the rate of fuel flow includes a pressure regulator control valve with a spring that is variably loaded by temperature responsive means.

8. The combination of claim 5 in combination with a blower for supplying air under pressure to said valve body inlet.

9. The combination of claim 8 wherein said modulating type valve has an electrically operated controller valve in combination with thermostatic means for controlling the operation of said blower and said electrically operated controller valve.

10. The combination of claim 9 in combination with an igniter also controlled by said thermostatic means and means at the outlet of said conduit means for spreading the gas into the air for better mixing thereof.

* * * * *